(12) United States Patent
Kumbhar et al.

(10) Patent No.: US 10,387,649 B2
(45) Date of Patent: Aug. 20, 2019

(54) DETECTING MALWARE WHEN EXECUTING IN A SYSTEM

(71) Applicant: Quick Heal Technologies Private Limited, Pune (IN)

(72) Inventors: Rohan Kumbhar, Pune (IN); Sushil Kumar Kuchan, Pune (IN)

(73) Assignee: Quick Heal Technologies Private Limited, Pune, Maharastra (IN)

( * ) Notice: Subject to any disclaimer, the term of this patent is extended or adjusted under 35 U.S.C. 154(b) by 274 days.

(21) Appl. No.: 15/338,455

(22) Filed: Oct. 31, 2016

(65) Prior Publication Data
US 2017/0124327 A1    May 4, 2017

(30) Foreign Application Priority Data

Oct. 31, 2015 (IN) .......................... 4133/MUM/2015

(51) Int. Cl.
*G06F 21/56* (2013.01)
*G06F 9/54* (2006.01)

(52) U.S. Cl.
CPC .......... *G06F 21/566* (2013.01); *G06F 9/545* (2013.01); *G06F 2221/034* (2013.01)

(58) Field of Classification Search
None
See application file for complete search history.

(56) References Cited

U.S. PATENT DOCUMENTS

| | | | | |
|---|---|---|---|---|
| 5,835,961 | A | * | 11/1998 | Harvey ............... G06F 12/1009 711/206 |
| 6,098,169 | A | * | 8/2000 | Ranganathan ...... G06F 11/3466 702/182 |
| 6,681,331 | B1 | | 6/2004 | Munson et al. |
| 7,444,331 | B1 | | 10/2008 | Nachenberg et al. |
| 8,065,728 | B2 | | 11/2011 | Wang et al. |
| 8,112,806 | B1 | | 2/2012 | Sobel et al. |
| 9,305,165 | B2 | | 4/2016 | Snow et al. |
| 2010/0031353 | A1 | | 2/2010 | Thomas et al. |

(Continued)

OTHER PUBLICATIONS

Abhinav Srivastava, Jonathon Giffin, Automatic Discovery of Parasitic Malware, Recent Advances in Intrusion Detection, 13th International Symposium, RAID 2010, Ottawa, Ontario, Canada, Sep. 15-17, 2010, Proceedings, pp. 97-117, vol. 6307 of the series Lecture Notes in Computer Science, Springer Berlin Heidelberg.

(Continued)

*Primary Examiner* — Joseph P Hirl
*Assistant Examiner* — Hassan Saadoun
(74) *Attorney, Agent, or Firm* — IPHorizons PLLC; Narendra Reddy Thappeta

(57) ABSTRACT

According to an aspect of the present disclosure, a kernel space and a user space for execution of instructions is provided in a computer system. A process executes in the user space and multiple modules execute in the kernel space, with the modules also generating events. It is then determined whether the generated events includes a set of events matching a pre-specified pattern representing a malicious process. If such as set of events is determined to be present, the process is notified as a malicious process. The steps of determining and notifying are performed in user space.

9 Claims, 7 Drawing Sheets

(56) References Cited

U.S. PATENT DOCUMENTS

2012/0255027 A1 10/2012 Kanakapura et al.
2015/0281267 A1* 10/2015 Danahy ............... H04L 63/1416
   726/23

OTHER PUBLICATIONS

Junghwan Rhee , Ryan Riley, Dongyan Xu, Defeating Dynamic Data Kernel Rootkit Attacks via VMM-based Guest-Transparent Monitoring, Availability, Reliability and Security, 2009. ARES '09, International Conference, Date of Conference: Mar. 16-19, 2009, pp. 1-8, IEEE.

Abhinav Srivastava , Jonathon Giffin, Efficient Monitoring of Untrusted Kernel-Mode Execution, NDSS Symposium 2011, Date: Feb. 7, 2011, pp. 1-18.

Abhinav Srivastava, Andrea Lanzi, Jonathon Giffin, Operating System Interface Obfuscation and the Revealing of Hidden Operations, Proceeding DIMVA'11 Proceedings of the 8th international conference on Detection of intrusions and malware, and vulnerability assessment, date Jul. 7-8, 2011, pp. 214-233, Springer-Verlag Berlin, Heidelberg.

* cited by examiner

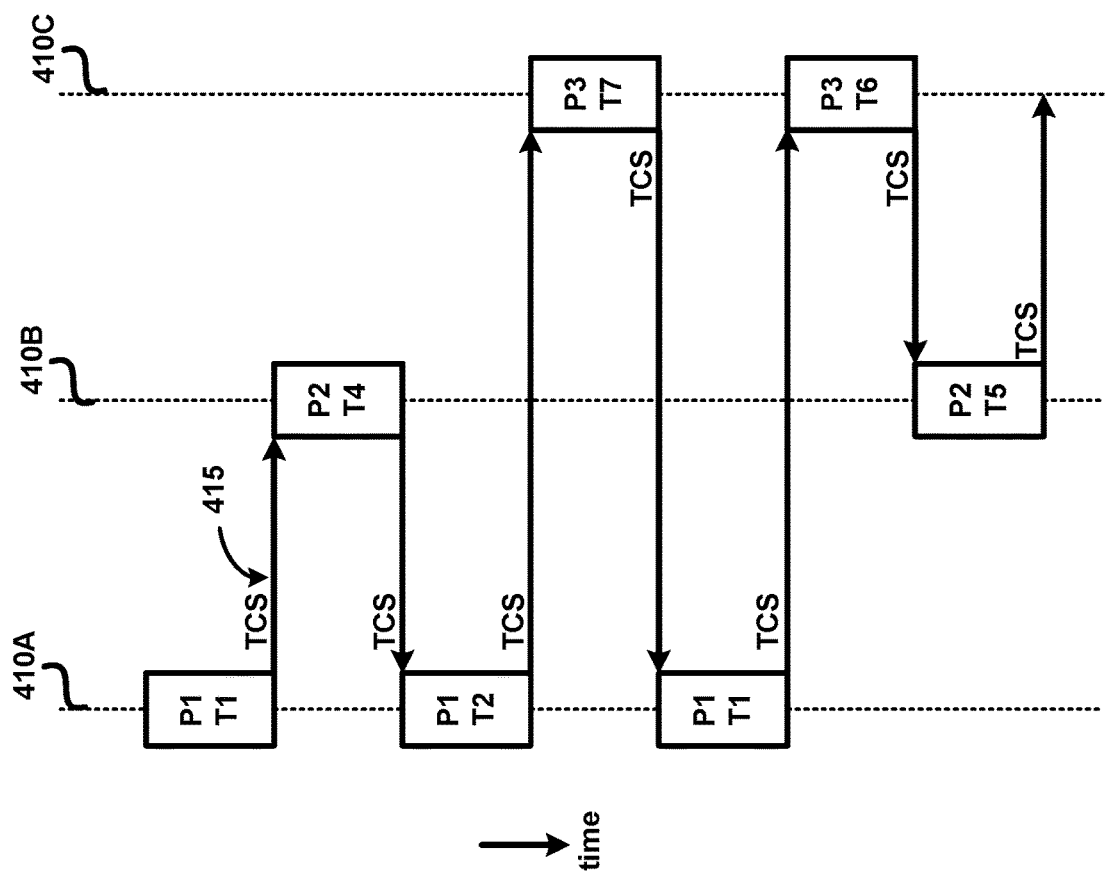

US 10,387,649 B2

DETECTING MALWARE WHEN EXECUTING IN A SYSTEM

PRIORITY CLAIM

The instant patent application is related to and claims priority from the co-pending India provisional patent application entitled, "DEDUCING ATTACKER-VICTIM RELATIONSHIP BETWEEN PROCESSES", Serial No.: 4133/MUM/2015, Filed: 31 Oct. 2015, which is incorporated in its entirety herewith to the extent not inconsistent with the disclosure herein.

BACKGROUND OF THE DISCLOSURE

Technical Field

The present disclosure relates generally to security platform solutions, and more specifically to detecting malware when executing in digital processing systems.

Related Art

Malicious software (commonly referred to as "malware") are designed specifically to damage or disrupt the operation of a system, as is well known in the relevant arts. The damage can be to software and/or the data maintained by the system, and disruption could entail performance degradation and/or outright shutting down of the system. The damage or disruption is generally realized when the malware executes on the system.

It may be accordingly desirable that the malware be detected when executing in a system. Aspects of the present disclosure are directed to such detection of malware.

BRIEF DESCRIPTION OF THE DRAWINGS

Example embodiments of the present disclosure will be described with reference to the accompanying drawings briefly described below.

FIG. 4A illustrates the manner in which multiple threads are executed concurrently in one embodiment.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE EMBODIMENTS OF THE DISCLOSURE

1. Overview

According to an aspect of the present disclosure, a kernel space and a user space for execution of instructions is provided in a computer system. A process executes in the user space and multiple modules execute in the kernel space, with the modules also generating events. It is then determined whether the generated events includes a set of events matching a pre-specified pattern representing a malicious process. If such as set of events is determined to be present, the process is notified as a malicious process. The steps of determining and notifying are performed in user space, and accordingly malware is able to be detected without affecting the performance of the computer system.

Several aspects of the present disclosure are described below with reference to examples for illustration. However, one skilled in the relevant art will recognize that the disclosure can be practiced without one or more of the specific details or with other methods, components, materials and so forth. In other instances, well-known structures, materials, or operations are not shown in detail to avoid obscuring the features of the disclosure. Furthermore, the features/aspects described can be practiced in various combinations, though only some of the combinations are described herein for conciseness.

2. Digital Processing System

Figure 1:
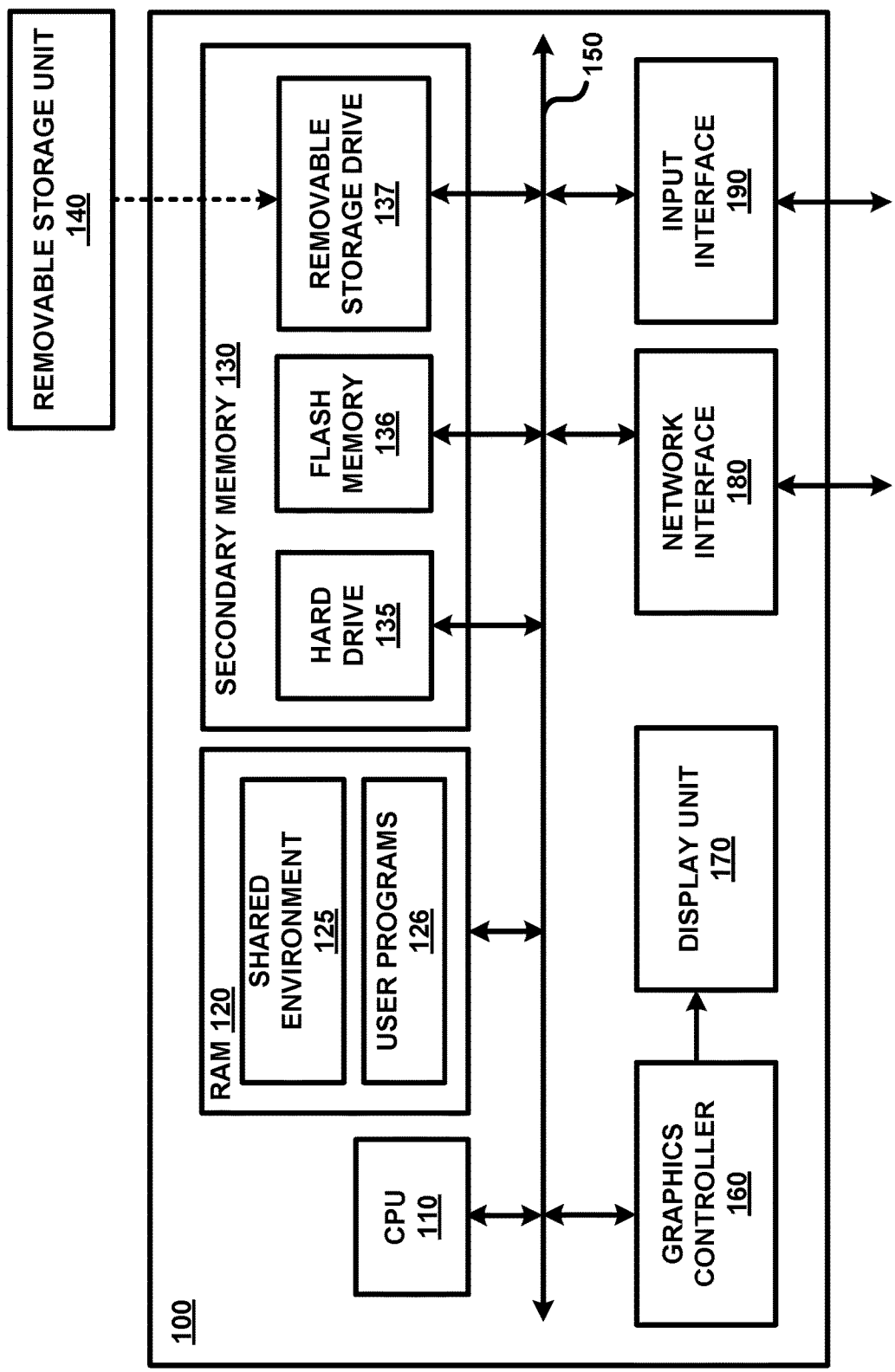
FIG. 1 is a block diagram illustrating the details of a digital processing system in which various aspects of the present disclosure are operative by execution of appropriate executable modules.

FIG. 1 is a block diagram illustrating the details of digital processing system 100 in which various aspects of the present disclosure are operative by execution of appropriate executable modules. Digital processing system 100 may contain one or more processors such as a central processing unit (CPU) 110, random access memory (RAM) 120, secondary memory 130, graphics controller 160, display unit 170, network interface 180, and input interface 190. All the components except display unit 170 may communicate with each other over communication path 150, which may contain several buses as is well known in the relevant arts. The blocks of FIG. 1 are described below in further detail.

CPU 110 may execute instructions stored in RAM 120 to provide several features of the present disclosure. CPU 110 may contain multiple processing units, with each processing unit potentially being designed for a specific task. Alternatively, CPU 110 may contain only a single general-purpose processing unit. RAM 120 may receive instructions from secondary memory 130 using communication path 150.

RAM 120 is shown currently containing software instructions constituting shared environment 125 and user programs 126. In one embodiment, user programs 126 include one or more application processes (hereafter "processes"). As is well known, a process is an instance of a software program that is loaded in RAM 120 and being currently executed by CPU 110. Multiple processes may be present in RAM 120 simultaneously, with the processes being concurrently executed by multiple processing units of CPU 110, or using techniques such as time-sharing using a single processing unit as is well known in the relevant arts. During execution, the processes may access data maintained in RAM 120 or in storage memory 130.

Shared environment 125 includes operating systems, device drivers, virtual machines, etc., which provide a (common) run time environment for execution of user programs 126. An operating system refers to software that manages the hardware and software resources in digital processing system 100 and provides common services for user programs 126. In the following disclosure, the operating system provided in digital processing system 100 is assumed to be time-sharing, that is, allocates the time/clock cycles of CPU 110 among multiple processes (as corresponding time slices) thereby enabling the processes to execute "concurrently" (multi-tasking), as is well known in the relevant arts.

Graphics controller 160 generates display signals (e.g., in RGB format) to display unit 170 based on data/instructions received from CPU 110. Display unit 170 contains a display screen to display the images defined by the display signals. Input interface 190 may correspond to a keyboard and a pointing device (e.g., touch-pad, mouse) and may be used to provide inputs. Network interface 180 provides connectivity to a network and may be used to communicate with other systems connected to the network.

Secondary memory 130 may contain hard drive 135, flash memory 136, and removable storage drive 137. Secondary memory 130 may store the data (such as process whitelist, frequency counters, etc, provided according to several aspects of the present disclosure) and software instructions (for implementing the steps of FIG. 2, described below), which enable digital processing system 100 to provide several features in accordance with the present disclosure. The code/instructions stored in secondary memory 130 may either be copied to RAM 120 prior to execution by CPU 110 for higher execution speeds, or may be directly executed by CPU 110.

Some or all of the data and instructions may be provided on removable storage unit 140, and the data and instructions may be read and provided by removable storage drive 137 to CPU 110. Removable storage unit 140 may be implemented using medium and storage format compatible with removable storage drive 137 such that removable storage drive 137 can read the data and instructions. Thus, removable storage unit 140 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 140 or hard disk installed in hard drive 135. These computer program products are means for providing software to digital processing system 100. CPU 110 may retrieve the software instructions, and execute the instructions to provide various features of the present disclosure described above.

The term "storage media/medium" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage memory 130. Volatile media includes dynamic memory, such as RAM 120. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 150. Transmission media can also take the form of acoustic or light waves, such as those generated during radio-wave and infra-red data communications.

It may be appreciated that the processes (user programs 126) executing in digital processing system 100 are commonly genuine/trusted processes. A trusted process is a process that has previously been identified as being safe (non-damaging and non-disruptive) for execution in digital processing system 100. In one embodiment, digital processing system 100 maintains a whitelist of trusted processes, identifies a process (corresponding software as well) as a trusted process if the process is contained in the whitelist and then only allows execution of the process.

However, there may be scenarios where some of the processes are actually malware processes that are impersonating (and thereafter operate as) trusted processes. Process hollowing is a specific technique used by some malware for impersonating a trusted process. Here, a trusted process is loaded in digital processing system 100 solely to act as a container for malicious/hostile code. At launch of the trusted process (loading into RAM 120), the trusted code is de-allocated and replaced/code injected with malicious code. This causes the malicious code to be executed, while the process related (operating system) data structures such as process environment block (PEB) would still be that of a trusted process. Such an attack would not be considered suspicious/malicious by external tools that inspect the processes externally or statically (e.g. by examining the process related data structures).

In a prior approach commonly used against code injection attacks, calls/invocations of the functions in the operating system (OS) are intercepted, and by associating it with previous call(s) made by the same process and gathering required associated information, the determination of whether a process is a malware is performed. In general, interception entails that the call sent from the process to the intended OS function is stopped, the above checks performed, and either the call is terminated (if the process is determined to be malware) or forwarded to the OS function.

It may be appreciated that such interception when performed for trusted processes would cause degradation in the performance of the operating system and by extension the performance of digital processing system 100. In addition, the act of intercepting a call is considered to be tampering with digital processing system 100, and often results in unexpected operating environment conditions, which again affects performance.

Aspects of the present disclosure are directed to detecting malicious processes executing in digital processing system 100 while overcoming some of the drawbacks with the prior approaches noted above. The manner in which digital processing system 100 detects malware executing in digital processing system 100 is described below with examples.

3. Detecting Malware when Executing in a System

Figure 2:
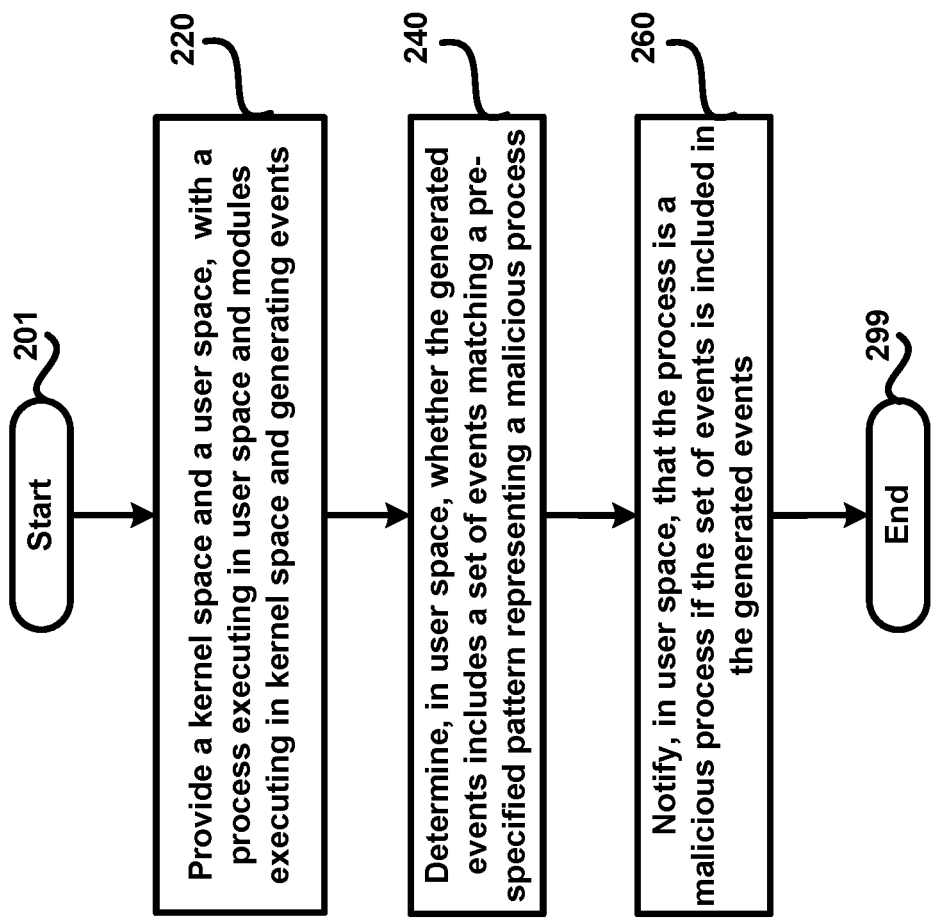
FIG. 2 is a flow chart illustrating the manner in which malware executing in a system is detected according to an aspect of the present disclosure.

FIG. 2 is a flow chart illustrating the manner in which malware executing in a system (100) is detected according to an aspect of the present disclosure. The flowchart is described with respect to the blocks of FIG. 1 merely for illustration. However, the features can be implemented in other systems and environments also without departing from the scope and spirit of various aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present disclosure. The flow chart begins in step 201, in which control immediately passes to step 220.

In step 220, digital processing system 100 provides a kernel space and a user space, with a process executing in user space and modules executing in kernel space and generating events. In particular, an operating system executing in digital processing system operates in two different modes—a user mode and a kernel mode, with each mode having a corresponding portion of the memory/space allocated for loading of instructions. The operating system switches between the two modes depending on what type of code/process is currently being executed. In addition, CPU 110 may provide several rings of protection, with the rings arranged in a hierarchy from most privileged (most trusted, usually numbered zero) to least privileged (least trusted, usually with the highest ring number). In such a scenario, kernel mode is executed in ring zero, while user mode is executed close to the highest ring number.

Generally, processes that are loaded in kernel space (and operate in kernel mode) have direct access to hardware components (such as graphics controller 160, network interface 180, etc.), while the processes that are loaded in user space (and operate in user mode) are forced to avail the services of the hardware component by invoking processes operating in kernel mode. In general, user created applications/processes (and some drivers) are executed in user mode, while core operating system components and low level software drivers (modules) run in kernel mode.

The modules executing in kernel space/mode are commonly designed to generate events that indicate the operation, internal state, etc. of the module, the associated hardware component or the environment of digital processing system 100. The generated events are typically made available to processes executing in user space, to facilitate troubleshooting of the user applications and driver software.

In step 240, digital processing system 100 determines, in user space (i.e., when operating in user mode), whether the generated events includes a set of events matching a pre-specified pattern representing a malicious process. Digital processing system 100 may receive the events generated by the modules executing in kernel space over a period and then identify the occurrence of each of the set of events in an order indicated by the pre-specified pattern. If all of the set of events are identified in the order, digital processing system 100 may determine that the generated events includes the set of events matching the pre-specified pattern, and does not include the set otherwise.

In step 260, digital processing system 100 notifies, in user space (i.e., when operating in user mode), that the process (currently executing in user space) is a malicious process if digital processing system 100 determines in step 204 that the set of events is included in the generated events. The notification may be provided on a user interface displayed on display unit 170. The flow chart ends in step 299.

It may be appreciated that the steps of determining (240) and notifying (260) in user space based on monitoring of events generated by the modules executing in kernel space, the need for intercepting calls/invocations to the modules is avoided. Accordingly, malware is facilitated to be detected without tampering the system and without degradation in the performance of digital processing system 100.

The manner in which malware executing in digital processing system 100 is detected according to FIG. 2 is illustrated below with examples.

4. Illustrative Example

FIGS. 3, 4A-4B, and 5A-5B together illustrate the manner in which malware executing in a system (100) is detected in one embodiment. In particular, the manner in which a malware employing the technique of process hollowing (noted above) is detected is described below. However, the features of the present disclosure may be used to detect other types of malware as well by determining corresponding pre-specified patterns in the events generated by modules executing in kernel space, as will be apparent to one skilled in the relevant arts by reading the disclosure herein. Each of the Figures is described in detail below.

Figure 3:
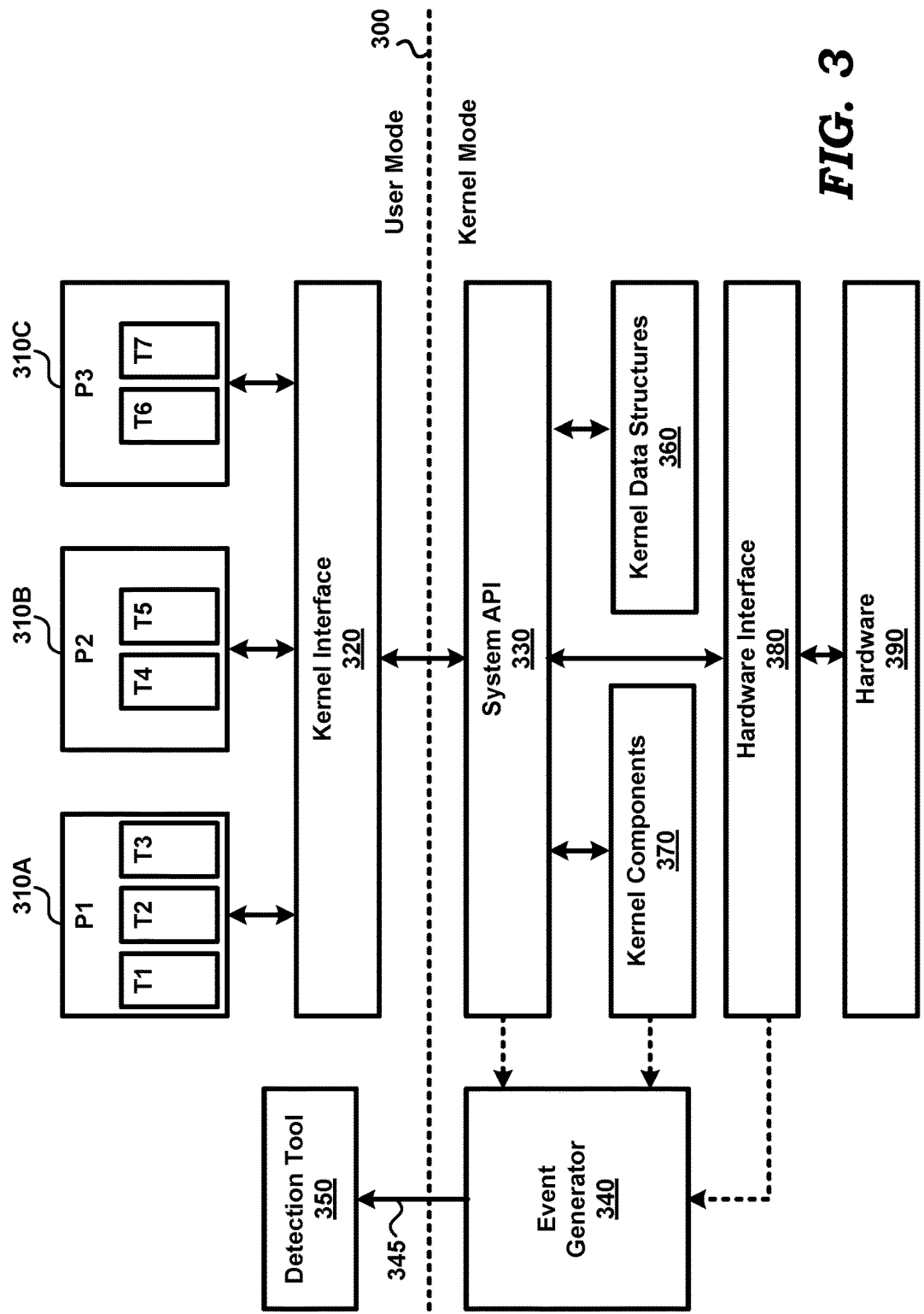
FIG. 3 is a block diagram illustrating the logical view of the internals of digital processing system in one embodiment.

FIG. 3 is a block diagram illustrating the logical view of the internals of digital processing system (100) in one embodiment. The block diagram is shown containing processes 310A-310C (respectively named "P1" to "P3"), kernel interface 320, system application program interface (API) 330, event generator 340, detection tool 350, kernel data structures 360, kernel components 370, hardware interface 380 and hardware 390. Each of the components is described in detail below.

Digital processing system 100 (specifically, the operating system executing therein) is shown operating in a user mode and a kernel mode (as indicated by the dotted line 300). The space above the dotted line may be viewed as representing the user space/memory, while the space below the dotted line may be viewed as representing the kernel space/memory. Process 310A-310C and kernel interface 320 are shown loaded in user space (and accordingly operating in user mode), while, system API 330, kernel data structures 360, kernel components 370 and hardware interface 380 are shown executing in kernel space.

Each of process 310A-310C represents a corresponding instance of a software program (including malware) executing in digital processing system 100. Each of threads T1-T7 represents a sequence of programmed instructions that is to be independently executed by the operating system. Typically, multiple threads (such as T1-T3) form part of a process (such as P1) and share resources such as memory while being executed concurrently. In contrast, processes P1-P3 do not share resources/memory.

System API 330 represents a software program (executing in kernel space) that provides various interfaces (routines, protocols, etc.) for performing various tasks associated with the operating system such as accessing files, sending/receiving data over a network, displaying a graphical user interface (GUI), receiving inputs specified in a GUI, etc. Kernel interface 320 is thin layer that exposes the interfaces of system API 330 to user applications (processes/threads) executing in user space. Each of threads T1-T7/processes P1-P3 invokes appropriate interfaces of kernel interface 320 for performing the desired tasks, which in turn causes invocations of the corresponding routines implemented in system API 330.

Kernel data structures 360 represent various data structures that are maintained as part of the operating system. The data structures keep track of the current processes/threads executing in user space, the specific input/output requests received/pending processing, etc. Kernel components 370 represent various software programs/processes that are executed as part of the operating system. Kernel components 370 typically include a thread scheduler, process loader, memory manager, file manager, etc.

Hardware interface 380 provides a set of standard calls to the hardware, thereby enabling higher layers (such as system API 330) to be implemented without having to write instructions specific to the components in hardware 390. Hardware interface 380 may translate the standard calls to machine level instructions appropriate to the components in hardware 390. For example, hardware interface 380 may provide a common/single CPU instruction set, while translating the instructions specified in the common set to the specific instruction set required for the type of CPU contained in hardware 390. Hardware 390 includes various hardware components contained in digital process system 100 such as CPU 110, RAM 120, secondary memory 130, display unit 170, network interface 180, input interface 190, etc.

Event generator 340 makes available to processes executing in user space, the events generated by the modules executing in kernel space (hereafter "kernel modules"). The kernel modules includes, but is not limited to, the routines/functions of system API 330, the various software programs in kernel components 370 and hardware abstractions routines in hardware interface 380. In one embodiment, event generator 340 receives (as indicated by dashed arrows) the events generated by the kernel modules, converts them to a standard/common format, and then makes available the events in common format to processes executing in user space.

Detection tool 350, provided according to several aspects of the present disclosure, monitors the events generated by event generator 340 and detects malwares by determining whether the monitored events include pre-specified patterns of events representing the malwares. The pre-specified patterns of events may be identified by understanding the operation of the malware upon execution in digital processing system 100. The manner in which a process hollowing malware operates upon execution is described below with examples.

5. Process Hollowing Malware

Figure 4B:
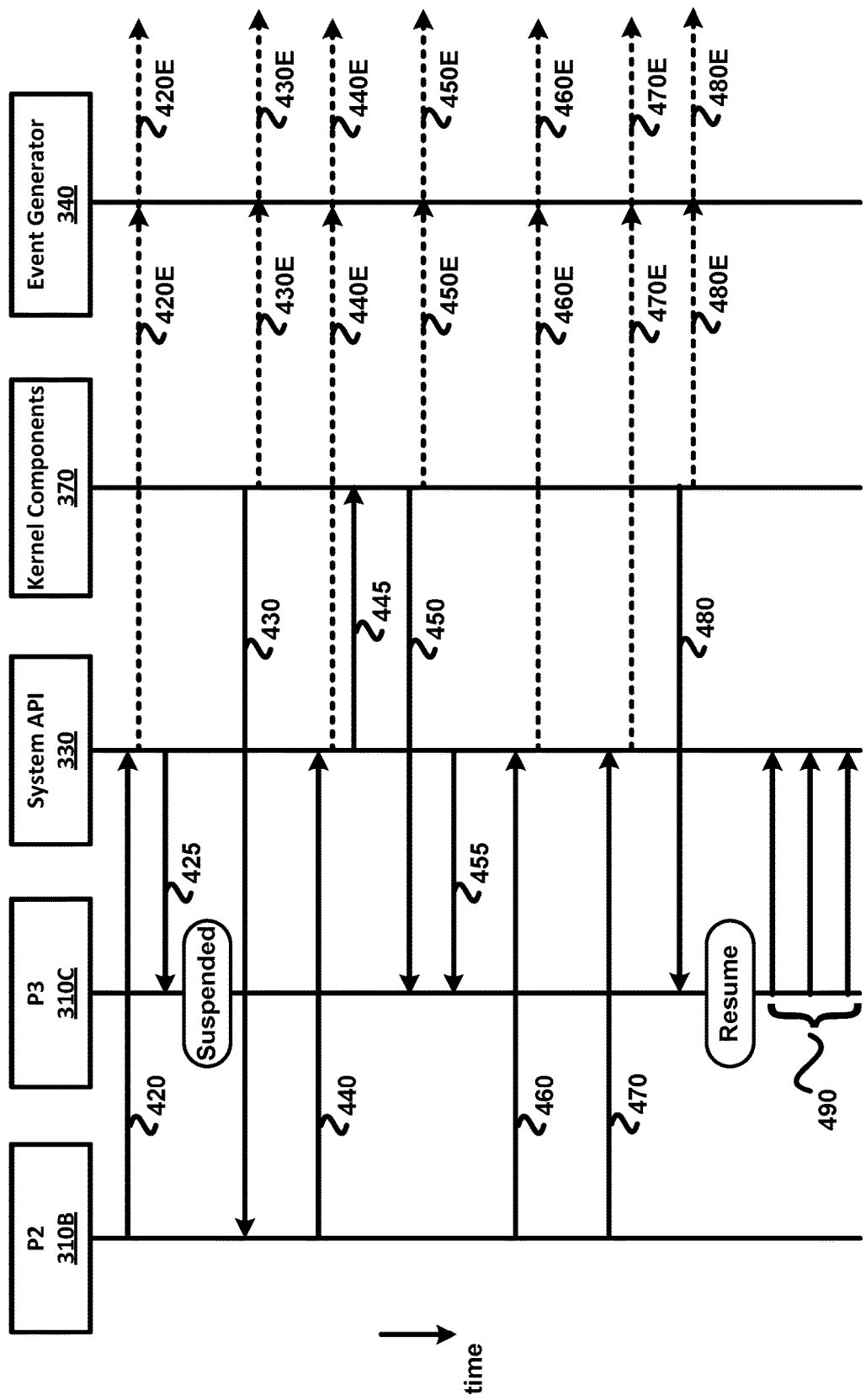
FIG. 4B is a sequence diagram illustrating the operation of a process hollow malware executing in a system in one embodiment.

FIGS. 4A and 4B together illustrate the manner in which a process hollowing malware operates when executing in a system (100) in one embodiment. For better understanding of the operation, the manner in which multiple threads are executed in the system is first described (FIG. 4A), followed by the operation of the process hollowing malware (FIG. 4B). Each of the Figures is described in detail below.

FIG. 4A illustrates the manner in which multiple threads are executed concurrently in one embodiment. As noted above, kernel components 370 includes a thread scheduler which operates to allocate clock cycles of CPU 110/time slices to the various threads executing in user space (T1-T7 in FIG. 3) such that the threads are facilitated to be "concurrently" executed.

As such, 410A-410C represents the execution timeline (with time shown vertically increasing towards the bottom) of the corresponding processes 310A-310C (P1 to P3), with the timeline including the execution of the various threads contained in the corresponding process.

Thread context switch (in general, execution context switch) 415 represents a change in the execution timeline, wherein the execution of a currently executing thread is stopped, and the execution of another (non-executing) thread is started. The switch may occur due to the expiry of the allocated time slice/clock cycles or due to the currently executing thread explicitly invoking a routine/function to handover execution to another thread. The thread context switch (TCS) typically entails storing and restoring the state (more specifically, the execution context) of the thread so that execution can be resumed from the same point at a later time.

Referring again to FIG. 4A, it may be observed that thread T1 is shown as executing first, after which a TCS occurs and thread T4 (of process T2) is executed. Similarly, TCS takes place at different time instances (as indicated by the horizontal arrows between the timelines) to cause different threads such as T2 of P1, T7 of P3, T5 of P2, etc. to be executed. It may be noted that in timeline 410A, thread T1 is shown as having resumed execution (by occurrence of T1 twice in the timeline), with the thread scheduler facilitating such resumption by storing and restoring the state of thread T1. In one embodiment, event generator 340 generates events corresponding to each of the thread context switches performed in digital processing system 100.

The description is continued illustrating the manner in which a process hollowing malware operates upon execution in a system.

FIG. 4B is a sequence diagram illustrating the operation of a process hollow malware executing in a system (100) in one embodiment. For illustration, it is assumed that process P2 (310B) is the malware process which is trying to impersonate a trusted process P3 (310C).

At 420, process P2 invokes a system function (routine of system API 330) for creating a new process (P3) in suspend mode. The new process is created as an instance of a trusted software. System API 330 accordingly is shown creating process P3 (by loading the trusted code of the trusted software) in suspended mode at 425. System API 330 is also shown generating an event 420E that is send to event generator 340, which in turn is shown forwarding the event 420E to processes executing in user space.

At 430, kernel components 370, in particular, the thread scheduler is shown issuing a TCS from P3 to P2. This is in view of the execution being transferred from P2 to P3 due to creation of the process, and then the thread scheduler determining that process P3 is to be suspended. Corresponding event 430E is also shown being generated.

At 440, process P2 invokes a system function to write data (the malicious code) into one or more memory locations. In response to the function determining that the memory locations are part of another process, the functions requests a TCS to P3 be performed (at 445). In response to the request, the thread scheduler performs a TCS to P3 (at 450). At 455, the function writes the data into the memory locations of the trusted process, thereby replacing the trusted code (previously loaded at 425) with the malicious code. Events 440E and 450E corresponding to the system function call and the TCS are accordingly generated.

At 460, process P2 invokes a system function for setting the execution context of P3. In particular, the execution context of P3 is set to execute the malicious code injected into P3, instead of the trusted code (still existing as part of P3 in the user space). Corresponding event 460E is shown being generated.

At 470, process P2 invokes a system function to resume process P2 (which has so far been in suspended mode). Accordingly, during a subsequent TCS, the thread scheduler resumes process P3 and executes the malicious code injected earlier by P2. Events 470E and 480E corresponding to the system function call and the TCS are accordingly generated.

Upon execution, process P2 may invoke several system functions (490) as part of the malicious activities performed by the malware. Such activities may include, but not limited to, various actions related to files, disk, network, etc. Thus, a malware process P2 (also referred to as "attacker" process) creates and impersonates a trusted process P3 (also referred to as "victim" process) for performing various malicious activities.

According to an aspect of the present disclosure, detection tool 350 monitors the events received from event generator 340 and then determine whether a pattern of events 420E, 430E, 440E, 450E, 460E, 470E and 480E are present in the same order in the generated events when a process (P2) is executing in user space. If such a pattern of events exists, detection tool 350 may notify (a user) that process P2 is a process hollowing malware.

It should be appreciated that though the events are shown as occurring one after the other, in real embodiments, there would be other events generated by the same process P2 (and also other processes). In other words, the events need not be immediately succeeding in time, but need only to be subsequently occurring over a short/long period (but in the order noted herein).

In addition, process P2 may create one or more threads and also threads as part of P3 to hide the code injecting process. Aspects of the present disclosure take threads into consideration by maintaining data structures similar to those maintained as part of kernel data structures 360. The description is continued with respect to the details of an example implementation of detection tool 350.

6. Deduction Tool

Figure 5A:
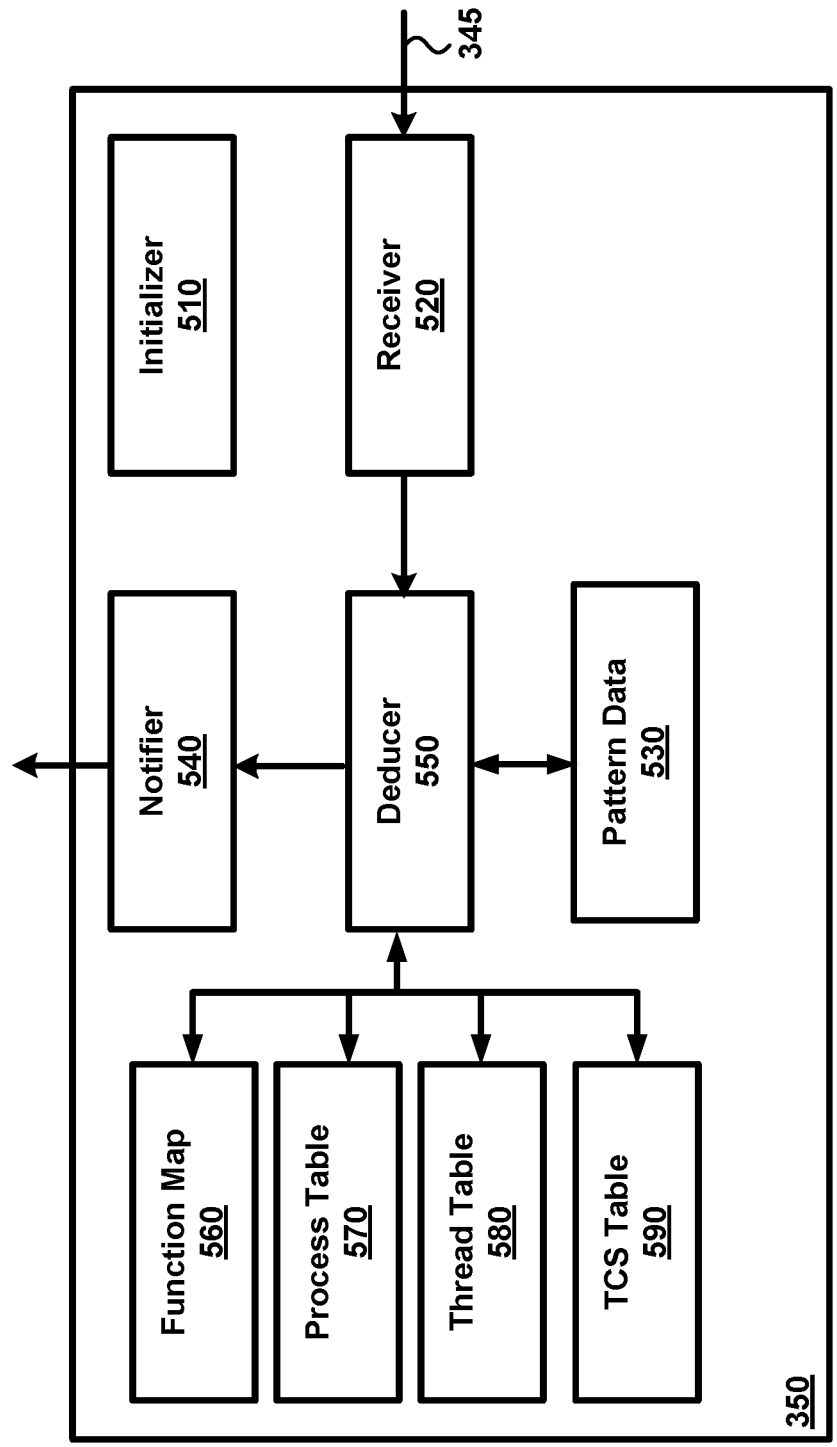
FIG. 5A depicts the internal details of a detection tool in one embodiment.
Figure 5B:
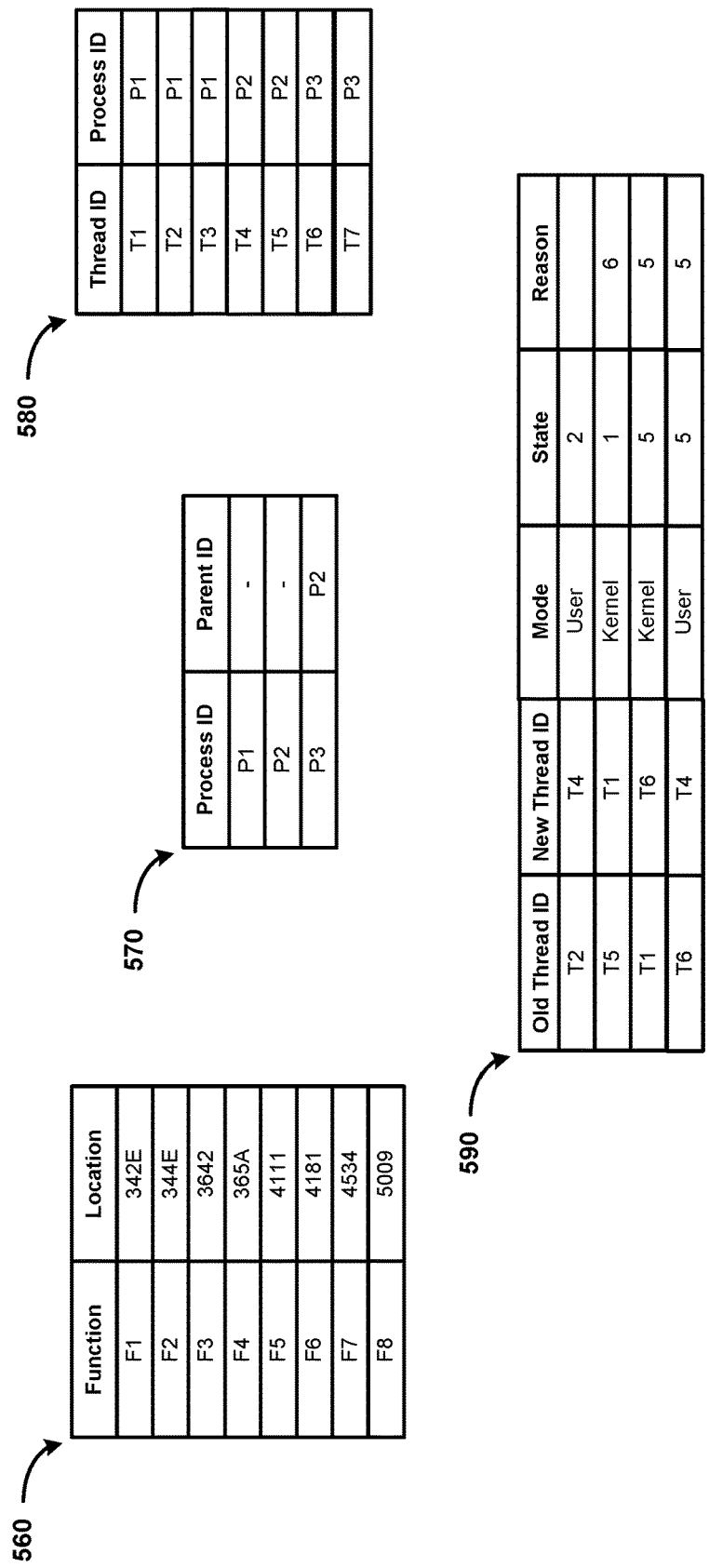
FIG. 5B illustrates the various data structures that are maintained for detecting malware executing in a system in one embodiment.

FIGS. 5A and 5B together illustrate an example implementation of a deduction tool in one embodiment. While FIG. 5A depicts the internal details of detection tool 350, FIG. 5B depicts various data structures maintained for detecting malware executing in a system. For illustration, each data structure is shown in the form of a corresponding table (having rows and columns). However, in alternative embodiments, the data described below may be maintained in other formats such as Extensible Markup Language (XML) and/or other data structures such as lists, trees, etc. as will be apparent to one skilled in the relevant arts by reading the disclosure herein.

Referring to FIG. 5A, deduction tool 350 is shown containing initializer 510, receiver 520, pattern data 530, notifier 540, deducer 550, function map 560, process table 570, thread table 580 and thread context switch (TCS) table 590. Each block is described in detail below.

Initializer 510 is invoked upon execution of detection tool 350, and initializes the various data structures in detection tool 350. In particular, initializer 510 scans the user memory space updates process table 570 and thread table 580 with existing processes and threads at the time of execution.

Table 570 of FIG. 5B depicts portions of a process table indicating the processes currently loaded into user space. Column "Process ID" specifies a unique identifier (such as P1, P2, etc.) of the process, while column "Parent ID" specifies the identifier of the process that created/is a parent of the process (with a "-" indicating that the parent is the operating system). Table 580 of FIG. 5B depicts portion of a thread table indicating the threads currently loaded into user space. Column "Thread ID" specifies a unique identifier (such as T1, T2, etc.) of the thread, while column "Process ID" specifies the identifier of the process that created (and accordingly contains) the thread.

Referring again to FIG. 5A, initializer 510 also generates a function map indicating the location in kernel space of some of the system functions (of interest) of system API 330. Such a function map is necessary as the events corresponding to invocation of system functions indicates only locations in kernel space and not the specific functions invoked.

According to an aspect, initializer 510 first determines the first memory location at which the kernel is loaded, and thereafter generates the function map in a pre-defined manner (based on the operating system, memory size, etc.). Such generation ensures that no system resources are consumed for creation of the function map, and accordingly does not affect the performance of the system.

Table 560 of FIG. 5B depicts portions of a function map generated by initializer 500. Column "Function" specifies a unique identifier (such as F1, F2, etc.) of the function, while column "Location" specifies the memory location at which the function is loaded into kernel space.

Referring again to FIG. 5A, pattern data 530 specifies the various patterns representing corresponding malicious processes. In one embodiment, pattern data 530 specifies for each malware, a corresponding ordered sequence of events to be matched. For example, for the process hollowing malware, pattern data 530 may specify the sequence of events 420E, 430E, 440E, 450E, 460E, 470E and 480E noted above. In addition, each pattern in pattern data 530 may be associated with a match count indicating the number of events in the pattern that have been successfully matched.

Receiver 520 receives events generated by event generator 340. Since a large number of events (typically in millions) is generally received, receiver 520 is also designed to filter the received events and to select only the desired events of interest. In one embodiment, receiver 520 selects/picks events related to starting and stopping of processes, starting and stopping of threads forming part of the processes, thread context switches (TCSs) and invocation of system functions.

Deducer 550 receives the filtered events from receiver 510 and processes them based on the type of the event. For example, when events related to starting and stopping of processes or threads are received, deducer 520 merely updates the corresponding process table 570 or thread table 580 based on the details received in the event.

Upon receiving a system function invocation event, deducer 550 retrieves the location specified in the received event and inspects function map 560 based on the location to identify the system function that is invoked. Deducer 550 then checks whether any of the patterns has a next event that matches the identified system function. In the scenario that a pattern has a next event as the identified system function, the match count of the pattern is increased by 1. It should be appreciated that in the scenario that the retrieved location is not present in function map 560 or if there is no pattern having the identified function as the next event, the received system function invocation event is discarded.

Upon receiving a TCS event, deducer 550 first saves the received TCS in TCS table 590. Deducer 550 then determines whether the new and old process IDs corresponding to the new and old thread IDs (in the TCS) based on table 580. Deducer 550 then checks whether any of the patterns has a next event that matches the determined TCS between the new and old process ID. Again, in the scenario that a pattern has a next event as the determined TCS event, the match count of the pattern is increased by 1.

Table 560 of FIG. 5B depicts portions of a TCS table that maintains details of the thread context switches that have occurred in user space. Column "Old Thread ID" specifies the identifier of the thread which is being stopped, column "New Thread ID" specifies the identifier of the thread that is being started, column "Mode" indicates whether the thread context switch has happed in user or kernel mode, column "State" indicates the state of the old thread and column "Reason" indicates the reason for the thread context switch.

Referring again to FIG. 5A, it may be appreciated that pattern data 530 may also specify the values of mode, state and reason that a received TCS event is required to have for the received TCS event to be deemed as a match for the next event. For example, for event 430E, pattern data may specify that the next event is a TCS from the new process/thread (P3) to the old process/thread (P2) with value of mode=user, state=suspended (value 5) and reason=5 (indicating that the suspended state was requested by the other process).

Deducer 550 also checks after incrementing the match count of a pattern whether the match count is equal to a threshold (typically, the number of events in the pattern). If the match count is equal to the threshold, deducer 550 sends an indication to notifier 540 of detection of a malware (as represented by the pattern for which the match count has equaled the threshold).

Notifier 540, in turn, sends a notification to a user of digital processing system 100. In one embodiment, notifier 540 displays the notification in the form of a pop-up user interface that is displayed on display unit 170 indicating the details of the malicious process, the specific malware/pre-specified pattern uncovered, a choice of actions that can be performed by a user, etc.

In one embodiment where deducer 550 determines that the malware employs the technique of process hollowing, deducer 550 also identifies the attacker process and the victim process. For example, deducer 550 may identify the current thread, determine the corresponding current process and identify the current process as the attacker process. Deducer 550 may also check the various TCS in table 590 to determine another thread (corresponding to another process) that was started in suspended mode and later resumed by the attacker process/thread. Deducer 550 may then identify the determined another process as the victim process.

Furthermore, the described features, structures, or characteristics of the disclosure may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the disclosure.

7. Conclusion

While various embodiments of the present disclosure have been described above, it should be understood that they have been presented by way of example only, and not limitation. Thus, the breadth and scope of the present disclosure should not be limited by any of the above-described exemplary embodiments, but should be defined only in accordance with the following claims and their equivalents.

It should be understood that the figures and/or screen shots illustrated in the attachments highlighting the functionality and advantages of the present disclosure are presented for example purposes only. The present disclosure is sufficiently flexible and configurable, such that it may be utilized in ways other than that shown in the accompanying figures.

Further, the purpose of the following Abstract is to enable the Patent Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present disclosure in any way.

What is claimed is:

1. A method implemented in a computer system, said method comprising:

providing a kernel space and a user space for execution of instructions, wherein a first process executes in said user space, wherein a plurality of modules execute in said kernel space and generate a plurality of events, wherein a first set of events are generated in response to said first process interacting with said plurality of modules, wherein a first set of modules of said plurality of modules implement corresponding system functions;

maintaining a function map indicating the location of each of said system functions in said kernel space, said first set of events including a first event indicating invocation of a system function located at a first location in said kernel space;

identifying based on said function map and said first location, that said system function is a first system function invoked by said first process, determining whether said plurality of events includes a first set of events matching a pre-specified pattern representing a malicious process, wherein said pre-specified pattern comprises an ordered sequence of invocations of a first set of system functions comprising said first system function, a second system function, a third system function and a fourth system function in that order, wherein said first system function is to create a second process in suspended mode, wherein said second system function is to write into one or more locations within the process space of said second process, wherein said third system function is to switch the execution context from said first process to said second process and switch execution of said second process to said one or more locations written by said second system function, wherein said fourth system function is to resume execution of said second process from said suspended mode, wherein said determining determines that said first process is a malicious process in response to said first set of events including said ordered sequence of invocation of said first set of system functions; and notifying that said first process is a malicious process if said first set of events corresponding to said ordered sequence of invocation of said first set of system functions is included in said plurality of events, wherein said determining and said notifying are performed in said user space.

2. The method of claim 1, further comprising:

filtering said plurality of events to identify events related to starting and stopping of processes, starting and stopping of threads forming part of the processes, the switching of execution context between the threads and invocation of system functions, wherein said filtering is also performed in said user space, wherein said determining is performed with respect to the events identified by said filtering.

3. The method of claim 2, further comprising:

receiving a second event of said first set of events, wherein said second event indicates that an execution context switch from an old thread to a new thread; and identifying an old process corresponding to said old thread and an new process corresponding to said new thread.

4. A non-transitory machine readable medium storing one or more sequences of instructions for enabling a digital processing system to detect malware executing in said digital processing system, wherein execution of said one or more instructions by one or more processors contained in said digital processing system enables said digital processing system to perform the actions of:

providing a kernel space and a user space for execution of instructions, wherein a first process executes in said user space, wherein a plurality of modules execute in said kernel space and generate a plurality of events, wherein a first set of events are generated in response to said first process interacting with said plurality of modules, wherein a first set of modules of said plurality of modules implement corresponding system functions;

maintaining a function map indicating the location of each of said system functions in said kernel space, said first set of events including a first event indicating invocation of a system function located at a first location in said kernel space;

identifying based on said function map and said first location, that said system function is a first system function invoked by said first process, determining whether said plurality of events includes a first set of events matching a pre-specified pattern representing a malicious process, wherein said pre-specified pattern comprises an ordered sequence of invocations of a first set of system functions comprising said first system function, a second system function, a third system function and a fourth system function in that order, wherein said first system function is to create a second process in suspended mode, wherein said second system function is to write into one or more locations within the process space of said second process, wherein said third system function is to switch the execution context from said first process to said second process and switch execution of said second process to said one or more locations written by said second system function, wherein said fourth system function is to resume execution of said second process from said suspended mode, wherein said determining determines that said first process is a malicious process in response to said first set of events including said ordered sequence of invocation of said first set of system functions; and notifying that said first process is a malicious process if said first set of events corresponding to said ordered sequence of invocation of said first set of system functions is included in said plurality of events, wherein said determining and said notifying are performed in said user space.

5. The non-transitory machine readable medium of claim 4, further comprising one or more instructions for:

filtering said plurality of events to identify events related to starting and stopping of processes, starting and stopping of threads forming part of the processes, the switching of execution context between the threads and invocation of system functions, wherein said filtering is also performed in said user space, wherein said determining is performed with respect to the events identified by said filtering.

6. The non-transitory machine readable medium of claim 5, further comprising one or more instructions for:

receiving a second event of said first set of events, wherein said second event indicates that an execution context switch from an old thread to a new thread; and identifying an old process corresponding to said old thread and an new process corresponding to said new thread.

7. A digital processing system comprising:

a processor;

a random access memory (RAM);

a machine readable medium to store one or more instructions, which when retrieved into said RAM and executed by said processor causes said digital processing system to perform the actions of:

providing a kernel space and a user space for execution of instructions, wherein a first process executes in said user space, wherein a plurality of modules execute in said kernel space and generate a plurality of events, wherein a first set of events are generated in response to said first process interacting with said plurality of modules, wherein a first set of modules of said plurality of modules implement corresponding system functions;

maintaining a function map indicating the location of each of said system functions in said kernel space, said first set of events including a first event indicating invocation of a system function located at a first location in said kernel space;

identifying based on said function map and said first location, that said system function is a first system function invoked by said first process, determining whether said plurality of events includes a first set of events matching a pre-specified pattern representing a malicious process, wherein said pre-specified pattern comprises an ordered sequence of invocations of a first set of system functions comprising said first system function, a second system function, a third system function and a fourth system function in that order, wherein said first system function is to create a second process in suspended mode, wherein said second system function is to write into one or more locations within the process space of said second process, wherein said third system function is to switch the execution context from said first process to said second process and switch execution of said second process to said one or more locations written by said second system function, wherein said fourth system function is to resume execution of said second process from said suspended mode, wherein said determining determines that said first process is a malicious process in response to said first set of events including said ordered sequence of invocation of said first set of system functions; and notifying that said first process is a malicious process if said first set of events corresponding to said ordered sequence of invocation of said first set of system functions is included in said plurality of events, wherein said determining and said notifying are performed in said user space.

8. The digital processing system of claim 7, further performing the actions of:

filtering said plurality of events to identify events related to starting and stopping of processes, starting and stopping of threads forming part of the processes, the switching of execution context between the threads and invocation of system functions, wherein said filtering is also performed in said user space, wherein said determining is performed with respect to the events identified by said filtering.

9. The digital processing system of claim 8, further performing the actions of:
receiving a second event of said first set of events, wherein said second event indicates that an execution context switch from an old thread to a new thread; and
identifying an old process corresponding to said old thread and an new process corresponding to said new thread.

\* \* \* \* \*